United States Patent [19]

Saretzky

[11] 3,941,210
[45] Mar. 2, 1976

[54] OIL MIST LUBRICATING SYSTEM AND CONDENSER DEVICE
[75] Inventor: Horst Saretzky, Ennepetal, Germany
[73] Assignee: De Limon Fluhme & Co., Dusseldorf, Germany
[22] Filed: May 9, 1974
[21] Appl. No.: 468,479

[52] U.S. Cl. ............ 184/6.21; 184/6.26; 184/55 A; 55/91
[51] Int. Cl.² ...................... B01D 55/00; F16N 7/26
[58] Field of Search ............ 55/512, 513, 514, 515, 55/516, 517, 518, 519, 418, 97, 98, 99, 91; 184/6.21, 6.26, 7 R, 7 D, 55 A, 49

[56] References Cited
UNITED STATES PATENTS

| 2,373,555 | 4/1945 | Folke | 184/6.26 |
|---|---|---|---|
| 2,442,202 | 5/1948 | Caley | 184/6.26 |
| 2,792,075 | 5/1957 | McBride | 55/97 |
| 2,947,383 | 8/1960 | Schytil | 55/98 |
| 3,107,986 | 10/1963 | Plaut | 55/97 |
| 3,219,324 | 11/1965 | Williams | 55/91 |
| 3,307,335 | 3/1967 | Shomaker | 55/418 |
| 3,541,762 | 11/1970 | Ramaswami | 55/98 |
| 3,556,490 | 1/1971 | Bockman | 55/91 |
| 3,665,684 | 5/1972 | White | 55/418 |
| 3,666,049 | 5/1972 | Kern | 184/6.26 |
| 3,678,662 | 7/1972 | Grote | 55/515 |

Primary Examiner—Richard C. Pinkham
Assistant Examiner—Marvin Siskind
Attorney, Agent, or Firm—Walter Becker

[57] ABSTRACT

An oil mist lubricating system with condenser device, which comprises an oil atomizing device having connected thereto a source of compressed air, in which a duct leading from the atomizing device to a lubricating point has an oil mist condenser device arranged therein which constricts the flow of oil through the duct, the condenser device including an oil permeable packing formed of movable particles effective to condense the atomized oil flowing therethrough.

22 Claims, 2 Drawing Figures

OIL MIST LUBRICATING SYSTEM AND CONDENSER DEVICE

The present invention relates to an oil mist lubricating system which comprises an oil mist device connected to a source of compressed air and provided with a conduit which leads to at least one lubricating point, and which is provided with a constriction through which oil is precipitated out of the oil mist as a liquid capable of forming drops and/or in a macrofine shape. The invention furthermore comprises a condenser nozzle which is usable as a nipple in such lubricating device and which is equipped with a threaded socket and an insert member comprising a nozzle bore.

The oil mist lubrication, i.e., the employment of oil mist for the lubrication of bearings, transmissions and the like is known. In general it is employed in this connection as central lubricating system in which the lubricant is from a central station conveyed through conduits to a plurality of lubricating points. This oil mist lubrication employs oil as lubricant which is conveyed pneumatically in mist form to the lubrication points at which the oil is precipitated out of the oil mist as a liquid capable of forming drops. A uniform distribution of the oil in the compressed air is effected by normal mist or micromist-oiler as oil mist devices, which are arranged in the compressed air conduit ahead of the consumer stations. The just produced oil mists which contain oil particles in finest distribution may through conduits be conveyed to the consumer stations ahead of which the oil has to be precipitated again.

For purposes of precipitating atomized oil, it has already been suggested in the conduits which connect the oil mist generated with the lubrication station or stations, one or more local constrictions in which from the oil mist there is to be precipitated a liquid adapted to form drops. Such constriction may be designed in particular as a condenser nozzle, various forms of which are known in the art. The purpose of the condenser nozzles consists in increasing the pressing out velocity by narrowing the cross section in such a way that the oil mist will be deposited when impacting upon the surface to be lubricated. In addition thereto, the condenser nozzles in oil mist lubricating systems are intended to supply lubricating points, for instance bearings of different sizes, to supply with different quantities of lubricant and also to permit an individual allotment of the oil mist quantity to the lubricating stations. In their simplest form, such known condenser nozzles have straight bores, in other words tube constrictions with diameters of the magnitude of from 1–3 mm. In these bores, the oil particles present in microfine form will at the lubricating station undergo an increase in velocity and will combine by the impact force to form greater drops which then will assure a good moistening.

Such simple nozzles with a constriction, and as the case may be also with a labyrinth effect through different passages and bores, have, however, not a sufficient degree of efficiency because only a degree of precipitation of from 75 to 80% can be realized. 25–20% of non-recompressed oil mists are not taken advantage of and are not desirable for ecological reasons inasmuch as they contaminate the air. Therefore, for economic reasons and also in order to avoid a further contamination of the air it is desirable to improve the degree of efficiency of oil mist lubricating devices and in particular of compressor nozzles. In this connection it may also be pointed out that the non-recompressed oil mists will when inhaling the same have serious health hazard and, moreover, may produce additional disadvantages in the vicinity of the lubricating areas.

To this end it has already been suggested to provide a porous center pot ahead of or in the nozzle of the lubricating devices. In this connection, however, it is disadvantageous that the pores of the center pot will clog up with coked residues after a certain time of operation (with hot zones) while other residues such as the components of alloys of the oil have to be added until a function of the nozzle will no more be assured and an exchange will be necessary.

This is particularly the case at the high nozzle speed which prevails as a rule in such lubricating systems while the degree of soiling is difficult to control. Finally, it is disadvantageous that each clogging up of pores of the center pot brings about a change in the dosing which change is very undesirable in this connection.

It is, therefore, an object of the present invention to improve the degree of efficiency of an oil mist lubricating device and of a compressor nozzle, in a most simple manner. It is an object of the present invention to provide an oil mist lubricating device as set forth in the preceding paragraph which will permit a precise and steady dosing without eliminating special additional servicing so that the drawbacks of the state of the art listed above will be eliminated.

The lubricating system according to the present invention which includes an oil mist device that is connected to a compressed air source and is equipped with a conduit leading to at least one lubricating station while said conduit has a constriction through which oil can be precipitated as a liquid capable of forming drops and/or in a macrofine form, is characterized primarily in that in the conduit at the constriction there is provided a packing formed of particles which fills the flow cross section of the conduit and is permeable to oil flow while the individual particles of said packing are movable relative to each other.

In this way, a re-compression, in other words precipitation of the oil from the oil mist is obtained to an extent of up to 99%. The particle packing has a self purifying effect so that no precipitations occur which could constrict the flow cross section. This is due to the movability of the packing particles relative to each other and to the readiness of continuously changing flow paths with a plurality of deviations.

Preferably, the lubricating system according to the invention is such that the constriction is arranged in a nipple with axial passage while the cross section of said constriction is relatively small with regard to the cross section of the remaining conduits, the particle packing being arranged in the nipple. As nipple in a lubricating system of the above mentioned type which as a rule is a central lubricating system, a condenser nozzle with a threaded socket and an insert member adapted to be inserted in a nozzle bore may be employed. According to the present invention a flow permeable container is inserted in an inner recess of the nozzle in the flow path, preferably ahead of the nozzle bore. This flow permeable container which contains a packing of particles in its interior has its particles movable relative to each other. As a result thereof, a condenser nozzle is provided which is structurally very simple and which has all the advantages of a particle packing, in particular a high degree of precipitation going up to 99%, the creation of a macromist of good moistening ability and a constant doseability. Expediently, the container comprises a cylindrical pipe section and two screening discs which close the end faces of the cylinder. The container may be arranged between a housing shoulder and the inner end face of the insert member.

Structurally, the condenser nozzle is advantageously so designed that the merging of the container comprising the particle packing with the nozzle bore is designed so as to conically narrow toward the outlet. It is furthermore advantageous also to design the merging area from the flow passage of the screw plug to the container so as to widen toward the container. The angle of the cone at the nozzle bore should be more pointed than that on the flow passage of the screw plug. In view of these features, for the intended purpose, favorable flow conditions are realized in the nozzle which conditions on one hand take care of the design of macro mist of good moistening ability and on the other hand take care of an impact velocity which befits or is in correspondence with the particle size of the oil.

Figure 1:
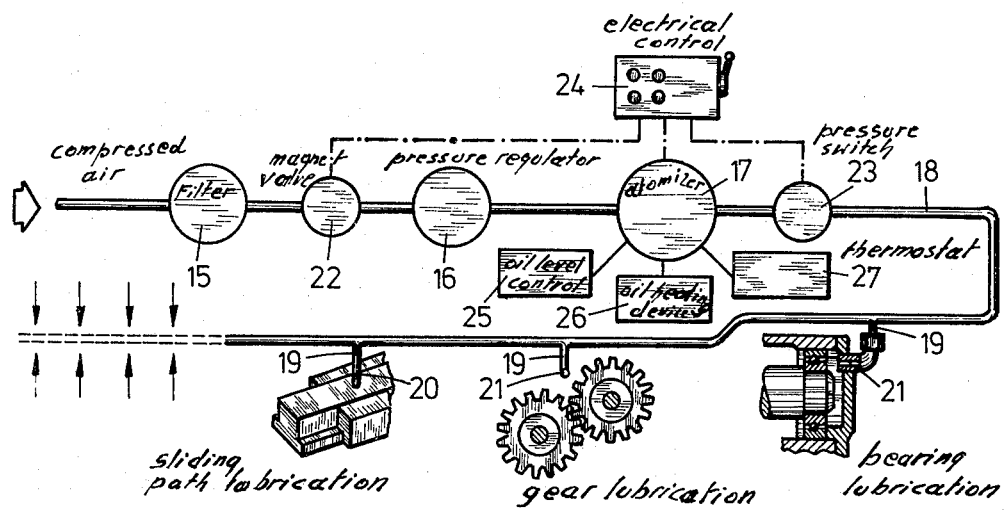
FIG. 1 shows the flow pattern of the oil mist central lubricating system.

Referring now to the drawings in detail, the oil mist central lubricating system according to FIG. 1 comprises a compressed air filter 15, a pressure control 16 and a micro mist oiler as oil mist device 17 which may be equipped in conformity with the plant or outlay to be supplied and comprising all containers of different sizes. The above elements substantially make up the base device. In practice additional devices are employed which are diagrammatically illustrated in FIG. 1. Thus the device furthermore comprises a magnetic valve 22, a pressure switch 23, an electric control 24, an oil level control 25, an oil heating system 26 and a thermostat 27. From the oil mist device 17, a conduit 18 leads to various lubricating stations. In order to assure the oil supply for these lubricating stations, the conduit 18 is provided with a corresponding member of branch lines 19. In these branch lines, at that end which is located at the lubricating station there is provided either a constriction 20 or a condenser nozzle 21. The drawing shows one of the condenser nozzles designed as axial screw-in nozzle whereas the other condenser nozzle is designed as angle nozzle.

Figure 2:
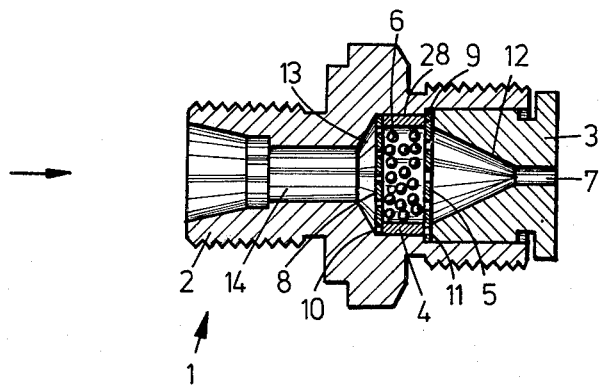
FIG. 2 is a detailed view showing the construction of my condensor nozzle.

The individual condenser nozzles 21 as well as the constriction 20 of the central lubricating station are provided with a particle packing arranged at said constriction. Said last mentioned packing fills the flow cross section so that the lubricant can still pass through while the individual particles of the packing are movable relative to each other. This arrangement of the particle packing will now be described in connection with the condenser nozzle 1 illustrated in FIG. 2 and forming a preferred embodiment of the invention.

The condenser nozzle 1 has a screw plug 2 with outer thread for connection for instance with one of the branch conduits 19. In the interior of the plug 2 there is provided a centrally stepped bore which represents a flow passage 14. The flow passage 14 is at the inlet end of the plug 2 designed conically for adaptation to the pipe diameter of the connecting conduit. Toward the outlet end, the flow passage 14 widens to form a conical transition 13 merging with a cylindrical part 28 which latter with a step 10 merges with the receiving section for an insert member 3.

The insert member 3 comprises a nozzle bore 7 which on its inside is designed as conical transition portion 12 with a conical angle. The inner end face side 11 of the insert member 3 engages a screen disc 5 of steel fabric which in its turn rests against housing shoulder 10. The screen disc 5 is flow permeable and closes one end face of a cylindrical tubular member 4 which is inserted into the cylindrical part 28 of the screw plug 2. The other end face of said screw plug 2 similarly closed by a screen disc 8 of steel fabric while being flow permeable. In this instance the housing shoulder 9 serves as abutment, said housing shoulder 9 being formed by the transition section 13 with the cylindrical part 28.

In the interior of the housing formed by the two screen discs 5 and 8 and the tube section 4, there is arranged a plurality of balls 6 which may be of synthetic material and which form a particle packing the particles of which are movable relative to each other. The individual balls have a diameter which is slightly greater than 1 mm. The packing density is so selected that the balls can easily move in any direction with regard to each other under the influence of the flow while the movability is aided due to the fact that the balls can roll upon each other. Due to the specific weight of the balls of synthetic material and the actual movability of the balls, a flow bed effect is obtained in operation.

The individual parts of the compresser nozzle can easily be assembled and the size and number of the balls 6 as well as the material employed therefor may be selected in conformity with the specific operational requirements to be met.

As will be evident from the preceding, it may be stated that due to the movement of the packing particles relative to each other and due to the fact that continuously varied flow paths are made available, an excellent degree of efficiency will be realized. Due to the self-cleaning effect, the doseability and the safety of operation of the lubricating system according to the invention and of the condenser nozzles according to the invention will be secured over long periods of operation. In addition thereto, servicing of the lubricating system is limited to a minimum. Another important advantage of the invention consists in that it can easily be produced and can easily be assembled and installed. By changing the density of the packing and by changing the diameter of the balls forming the packing, the degree of precipitation as well as the size of the oil particles being formed can be closely controlled. For instance it would be possible by increasing the balls to bring about a reduction in the primary precipitation behind the nozzle in a controlled manner so that residual mist which can easily be conveyed can be held in readiness for further lubrication points at which a secondary precipitation may be effected. By the design of the condenser nozzle according to the invention it is also possible to adapt the effect of the condenser nozzles to the various conditions of operation for instance to the path over which the oil mist has to move after leaving the nozzle until it reaches the last surface to be moistened or lubricated.

It is, of course, to be understood that the present invention is, by no means, limited to the specific showing in the drawing, but also comprises any modifications within the scope of the appended claims.

What I claim is:

1. An oil mist condenser device for condensing oil drops from a fluid flow of oil mist carrying gas comprising in combination a duct, a constriction formed within the duct, a ball packing formed of particles arranged adjacent to the constriction and variably filling the flow cross section but being permeable to oil flow to condense drops of oil from said oil mist, the individual particles of said packing being freely movable relative to one another thereby forming variable paths for said drops.

2. A condenser device in combination according to claim 1, in which said particles are of spherical shape.

3. A condenser device in combination according to claim 2, in which said particles have a diameter greater than 1 mm.

4. A condenser device in combination according to claim 1, in which said particles are of ovoidal shape.

5. A condenser device in combination according to claim 1, in which said particles are made of a synthetic material having a low specific gravity relative to air.

6. A condenser device in combination according to claim 5, in which said particles consist of a polyamide in flow bed.

7. A condenser device in combination according to claim 1, which includes: a tubular member forming part of said duct and containing said constriction in a central flow bore of said tubular member, and a nozzle member having a nozzle bore and being insertable in said tubular member to allow continuity of self-cleaning flow through the central flow bore and the nozzle bore, and a container interposed between said tubular member and said nozzle member and containing the said ball packing.

8. A condenser device in combination according to claim 7, in which said container consists of a tube section and two perforated discs closing the end thereof.

9. A condenser device in combination according to claim 8, in which said discs are made of steel.

10. A condenser device in combination according to claim 7, in which said tubular member has a step formed therein, and in which said container is held between said step on one side and the inner end of said nozzle member on the other side.

11. A condenser device in combination according to claim 7, in which said nozzle bore comprises a constant diameter section, and a transition section conically tapering from the end of said nozzle bore adjacent to said container, to the constant diameter section.

12. A condenser device in combination according to claim 11, in which the cone angle of the transition section of said nozzle bore is smaller than the cone angle of the transition portion of the central flow bore.

13. A condenser device in combination according to claim 7, in which said central flow bore comprises a constant diameter constriction portion and a transition portion tapering conically from the end of said central flow bore adjacent to said container, to the constant diameter constriction portion.

14. A condenser device in combination according to claim 1, which is screw threaded for connection of the device to an adjacent part of a duct.

15. A condenser device in combination according to claim 1, which is made of metal selected from brass and steel.

16. A condenser device in combination according to claim 1, in which said ball packing is arranged upstream of the constriction.

17. An oil mist lubricating system, which comprises in combination an oil atomizing device, a source of compressed air connected to said atomizing device, a duct leading from said atomizing device to a lubricating point, and an oil mist condenser device arranged in said duct and constricting the flow of oil through said duct, said condenser device including an oil permeable ball packing formed of freely movable particles 99% effective to condense the atomized oil flowing therethrough.

18. A lubricating system in combination according to claim 17, in which the packing density of said particles is so chosen that a fluidized bed operational effect is produced.

19. A nozzle for condensing liquid drops from a fluid flow of liquid mist carrying gas, said nozzle comprising an inlet passage at one end connected to a conduit to supply said flow of liquid mist carrying gas, a substantially larger intermediate passage having confined therein a mass of loosely packed, relatively movable particles, the movement of said particles producing changeable flow paths for said fluid flow, and a restricted outlet port at the other end substantially smaller than said inlet passage.

20. A nozzle as claimed in claim 19, in which said particles are substantially spherical.

21. A nozzle for condensing oil drops for lubrication from a fluid flow of oil mist carrying gas under pressure, said nozzle having a flow passage therethrough comprising an inlet passage to be connected to a conduit to supply said oil mist carrying gas under pressure, a substantially larger intermediate passage having an oil condensing packing in said passage, said packing comprising spaced perforate end walls transverse to said passage and a mass of loosely packed, globular particles between said walls and movable relative to each other as said gas passes therethrough, the movement of said particles producing changeable flow paths for said fluid flow, said flow passage also including an output port substantially smaller than said inlet passage, a widening passage between said inlet passage and said intermediate passage, and a narrowing passage between said intermediate passage and said outlet port.

22. A nozzle as claimed in claim 21, in which said nozzle is formed by two coaxially telescoped parts, one of said parts providing said outlet port and said narrowing passage from said intermediate passage to said outlet port, said one of said parts telescoping within the other part, said oil condensing packing including a cylindrical, peripheral sleeve between said end walls, said one of said parts retaining said packing in said intermediate passage.

* * * * *